US006799327B1

(12) United States Patent
Reynolds et al.

(10) Patent No.: US 6,799,327 B1
(45) Date of Patent: Sep. 28, 2004

(54) PROGRAM GUIDE WITH SELECTABLE ADVERTISEMENTS AND PSEUDO-ADS

(75) Inventors: Steven J. Reynolds, Littleton, CO (US); Elizabeth Fontana Fitzwilson, Tulsa, OK (US); Michael D. Ellis, Boulder, CO (US); Franklin E. Boyer, Cleveland, OK (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 09/352,376

(22) Filed: Jul. 13, 1999

Related U.S. Application Data

(60) Provisional application No. 60/092,708, filed on Jul. 14, 1998.

(51) Int. Cl.[7] .......................... H04N 5/445; G06F 3/00; G06F 13/00
(52) U.S. Cl. ............................. 725/42; 725/43; 725/52; 725/60; 725/61; 725/40
(58) Field of Search ............................ 725/40, 42, 43, 725/39, 52, 59, 60, 61, 44, 53

(56) References Cited

U.S. PATENT DOCUMENTS

| | | | |
|---|---|---|---|
| 4,704,725 A | 11/1987 | Harvey et al. | 380/9 |
| 4,706,121 A | 11/1987 | Young | 358/142 |
| 4,799,683 A | 1/1989 | Bruner, Jr. | 273/138 A |

(List continued on next page.)

FOREIGN PATENT DOCUMENTS

| | | | | |
|---|---|---|---|---|
| EP | 0 620 688 A2 | 10/1994 | | H04N/7/14 |
| EP | 0 624 039 A2 | 11/1994 | | H04N/7/173 |
| GB | 2 147 773 A | 5/1985 | | A63F/9/22 |
| GB | 2 300 535 A | 11/1996 | | H04N/5/262 |
| WO | WO 95/01058 | 1/1995 | | H04N/7/16 |
| WO | WO 97/09699 | 3/1997 | | G07F/17/32 |
| WO | WO 97/28636 | 8/1997 | | H04M/11/08 |
| WO | WO 97/49242 | 12/1997 | | H04N/7/10 |

OTHER PUBLICATIONS

LottoBot, http://lotobot.net (Feb. 1999), pp. 1–14.
SGI Insights, Scientific Gaming International, vol. 1, Issue No. 5 (Jan. 1999), pp. 1–4.
Amazon.com (Oct. 1999), downloaded from http://web.archive.org/web/–199911013091817/http://amazon.com on Feb. 26, 2004, pp. 1–9.
Ross Peddicord, "New on TV: You Bet Your Horse," The Sun, Balitomore, Mayland, Dec. 15, 1994, pp. 1A and 16A.
Yee–Hsiang Chang et al., "An Open–Systems Approach To Video On Demand," IEEE Communications Magazine, May 1994, pp. 68–80.
Probe XL Brochure, AutoTote Systems Inc., Newark, Delaware (undated).
Probe Self Service Screen Activated Machine Brochure, AutoTote Systems Inc., Newark, Delaware (undated).

(List continued on next page.)

*Primary Examiner*—Vivek Srivastava
*Assistant Examiner*—Ngoc Vu
(74) *Attorney, Agent, or Firm*—Fish & Neave

(57) ABSTRACT

Television program guides are equipped with advertisements and "pseudo-ads." Pseudo-ads generally include non-advertising subject matter such as games, weather information, celebrity interviews, etc. Pseudo-ads are mixed in with regular advertisements as they are displayed. In one embodiment of the invention, viewers may customize the display of advertising information using buttons on a remote control or set-top box to display desired regular advertisements or pseudo-ads. Both regular and pseudo-ads may be selected to obtain additional information or to initiate associated actions. These and other aspects of the invention help to maintain the viewer's interest in the program guide, and allow more advertisements to be viewed.

168 Claims, 10 Drawing Sheets

U.S. PATENT DOCUMENTS

| | | | |
|---|---|---|---|
| 4,842,278 A | 6/1989 | Markowicz | 273/138 A |
| 5,083,271 A | 1/1992 | Thacher et al. | 364/411 |
| 5,083,800 A | 1/1992 | Lockton | 273/439 |
| 5,227,874 A | 7/1993 | Von Kohorn | 358/84 |
| 5,233,654 A | 8/1993 | Harvey et al. | 380/20 |
| 5,249,044 A | 9/1993 | Von Kohorn | 358/86 |
| 5,329,589 A | 7/1994 | Fraser et al. | 379/91 |
| 5,408,417 A | 4/1995 | Wilder | 364/479 |
| 5,415,416 A | 5/1995 | Scagnelli et al. | 273/439 |
| 5,537,143 A * | 7/1996 | Steingold et al. | 725/119 |
| 5,589,892 A | 12/1996 | Knee et al. | 348/731 |
| 5,822,123 A | 10/1998 | Davis et al. | 348/564 |
| 5,830,068 A | 11/1998 | Brenner et al. | 463/42 |
| 5,838,314 A | 11/1998 | Neel et al. | 345/327 |
| 5,857,911 A * | 1/1999 | Fioretti | 463/40 |
| 5,921,865 A | 7/1999 | Scagnelli et al. | 463/17 |
| 5,936,661 A * | 8/1999 | Trew | 725/114 |
| 5,940,073 A * | 8/1999 | Klosterman et al. | 345/327 |
| 6,024,641 A | 2/2000 | Sarno | 463/17 |
| 6,168,521 B1 | 1/2001 | Luciano et al. | 463/18 |
| 6,177,931 B1 * | 1/2001 | Alexander et al. | 345/327 |
| 6,277,026 B1 | 8/2001 | Archer | 463/42 |
| 6,325,716 B1 | 12/2001 | Walker et al. | 463/17 |
| 2002/0010623 A1 | 1/2002 | McCollom et al. | 705/14 |

OTHER PUBLICATIONS

The Grand Stand System Brochure, AutoTote Systems Inc., Newark, Delaware (undated).

Probe Voucher Dispenser Module, AutoTote Systems Inc., Newark, Delware (undated).

AutoTrak II System Overview, AutoTote Systems Inc., Newark, Delaware, Sep. 1993, pp. 18–22.

* cited by examiner

PROGRAM GUIDE WITH SELECTABLE ADVERTISEMENTS AND PSEUDO-ADS

This application claims the benefit of U.S. Provisional Application No. 60/092,708 filed Jul. 14, 1998.

BACKGROUND OF THE INVENTION

This invention relates to interactive television program guides, and more particularly, to displaying advertising in program guides such that the viewer's interest is maintained.

Cable, satellite, and broadcast television systems provide viewers with a large number of television channels. Viewers have traditionally consulted printed television program schedules to determine the programs that are being broadcast at a particular time. More recently, interactive television program guides have been developed to allow viewers to display program information on their television screens.

Interactive program guides are typically implemented on set-top boxes. These program guides allow viewers to view television program listings in different arrangements. For example, a viewer may instruct the program guide to display a grid of program listings organized in a channel-ordered or a time-ordered list. Program information may also be obtained by tuning the television receiver to a channel that displays previews or other promotional information.

Program listings may be searched and sorted by type (e.g., movies, sports, etc.) or by title (i.e., alphabetically). Some guides allow viewers to obtain additional information for a program by placing a highlight region on a program list entry and pressing a button on a remote control or on the set-top box. Viewers may also be able to purchase a pay-per-view program from the program guide or set a reminder for a future program by highlighting a designated location and pressing a remote control or set-top box button. Some systems allow the viewer to record programs by highlighting and selecting a specific program and pressing a designated button.

The availability of such a large number of channels sometimes forces viewers to use program guides for several minutes at a time. This gives program providers and others an incentive to include additional information in these guides with the program listings. For example, advertisements may be provided to give the viewer access to information about products and services. This gives the advertisers access to an audience that it might not otherwise reach, and gives viewers access to useful information. There must be some incentive for a viewer to use a program guide for an extended time period. It is most likely that a viewer will use the guide to look for television programs, and any viewing of advertisements while the guide is used will be incidental. Thus, while numerous ads may be available in a television program guide, viewers will often only glance at a few of them—those that are displayed during the short periods of time that they are displaying the guide as they seek desirable programming.

It is therefore an object of the present invention to provide a program guide system with features that encourage viewers to use the program guide and to view additional advertisements.

SUMMARY OF THE INVENTION

An interactive television program guide that displays regular advertisements and pseudo-ads on a program guide screen is provided. Pseudo-ads typically include non-advertising materials that are provided for entertainment or informational purposes. Pseudo-ads encourage the viewer to use the television program guide for an extended period of time and cause more regular ads to be viewed. The viewer may use a remote control or a button on a television set-top box or other suitable television equipment to select a desired pseudo-ad or advertisement that has been displayed. The viewer can select an advertisement or pseudo-ad to obtain more information about an advertised item or to launch an application that is associated with an advertised item.

The pseudo-ads provide viewers with an added incentive to use the television program guide for an extended period of time.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
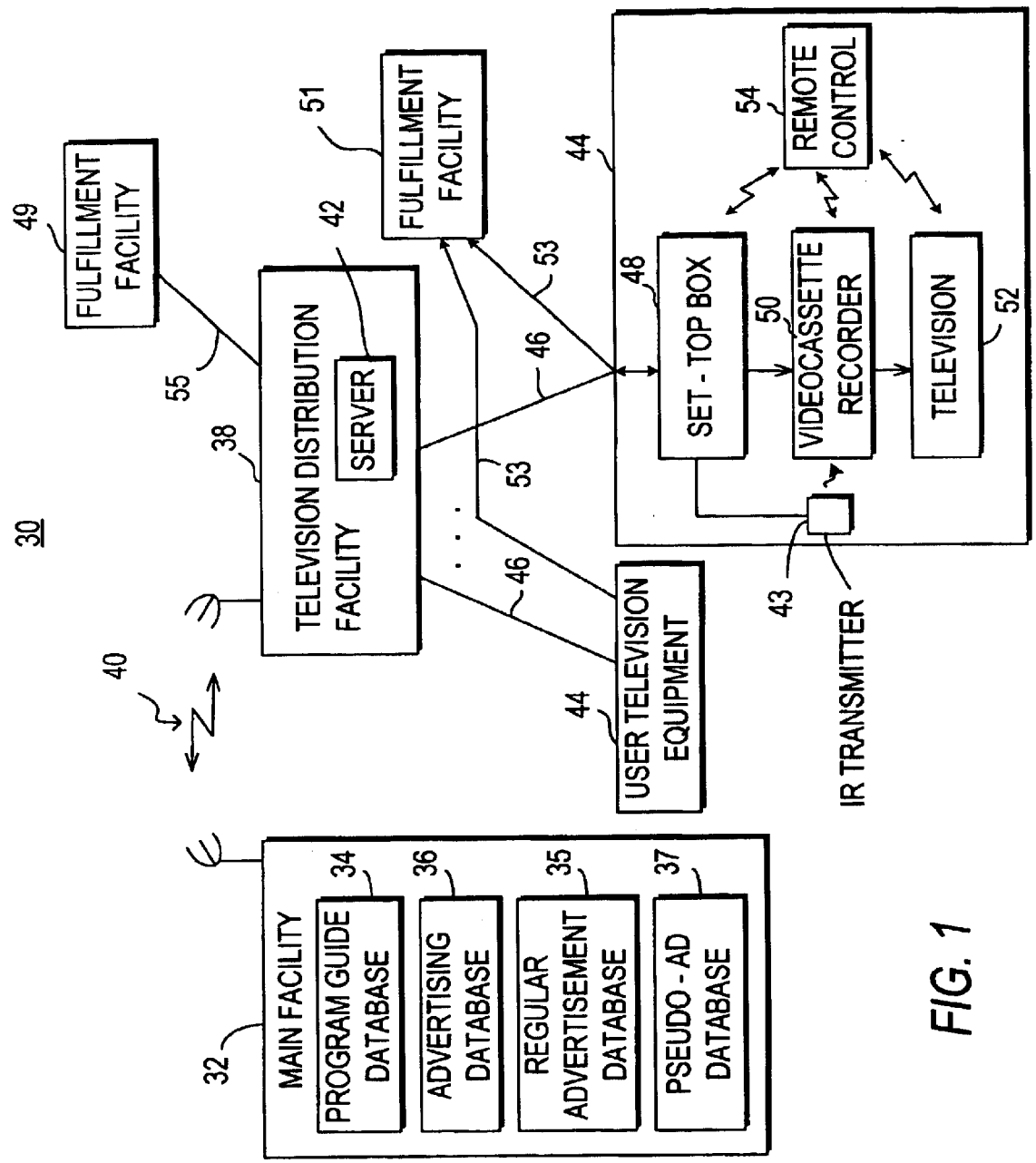
FIG. 1 depicts a system in which an interactive television program guide may be implemented in accordance with the present invention.

An illustrative program guide system 30 in accordance with the present invention is shown in FIG. 1. Main facility 32 contains a program guide database 34 for storing program guide information such as television program guide listings data, program previews, pay-per-view ordering information, television program promotional information, etc.

System 30 may display advertising information for viewers with an interactive television program guide. "Advertising information," as defined herein, generally includes two types of information. Regular advertisements are commonly provided by product manufacturers and service providers to entice audiences to purchase their products. Pseudo-ads are non-advertising materials that are used to encourage viewers to use the program guide for a longer period of time, thereby causing them to view more regular advertisements. Regular advertisements and pseudo-ads may be stored in a single advertising database 36, or they may be stored separately in a regular advertising database 35 and a pseudo-ad database 37. If desired, some of all of the advertising information may be provided to and stored at television distribution facilities such as distribution facility 38 (described below). Regular advertisements and pseudo-ads may also be generated or stored locally at the viewer's set top box.

The content of the pseudo-ads may be directed toward any suitable subject that interests viewers. Some pseudo-ads may allow viewers to play games. One way in which a game may be played in a television program guide is described in U.S. patent application Ser. No. 09/140,965 filed Aug. 27, 1998 which is hereby incorporated by reference herein in its entirety. Other examples include lotteries, auctions and video clips of interviews with celebrities.

If desired, pseudo-ads may contain information that is related to the program guide. For example, one pseudo-ad might notify the viewer that a new message has been received from the program provider. The viewer may select the pseudo-ad to read the message. Another pseudo-ad might notify the viewer that a program that has been previously selected for viewing or recording is about to begin. The viewer may select the pseudo-ad to obtain information about the program or to change viewing or recording options.

A help message may serve as still another pseudo-ad. This type of pseudo-ad may appear at regular intervals, or it may appear in response to viewer input, when the system interprets the viewer's input as indicating that assistance is required. The viewer may select such a help pseudo-ad to obtain information about which actions are allowed for the screen being displayed. A program guide with contextual help features is described in Davis et al. U.S. Pat. No. 5,822,123 which is hereby incorporated by reference herein in its entirety. Similar help context may be provided using pseudo-ads.

Information from databases 34, 36 and 37 may be transmitted to multiple television distribution facilities such as television distribution facility 38 via communications links such as communications link 40. Only one television distribution facility is shown here to avoid over complicating the drawings. Link 40 may be a satellite link, a telephone network link, an Internet link a cable or fiber optic link, a microwave link, a combination of such links, or any other suitable communications path. Television distribution facility 38 is preferably a facility for distributing television signals to viewers, such as a cable system headend, a broadcast distribution facility, or a satellite television distribution facility.

The program guide information transmitted by main facility 32 to television distribution facility 38 may include television program data such as program times, channels, titles, descriptions, etc. Transmitted program information may also include pay program data such as pricing information for individual (i.e. pay-per-view) programs and subscription channels (HBO, SHOWTIME, etc.), time windows for ordering programs and channels, telephone numbers for placing orders that cannot be impulse ordered, etc. The advertising information transmitted by main facility 32 to television distribution facility 38 may include text, graphics, videos, and links or other information providing ways to access to various products and services.

If desired, some of the program guide and advertising information may be provided using data sources at facilities other than main facility 32. For example, data related to order processing (e.g., billing data and the like) may be generated by an order processing and billing system that is separate from main facility 32 and separate from television distribution facility 38. Similarly, both regular advertisements and pseudo-ads may be generated by a single advertising facility that is separate from main facility 32 and television distribution facility 38 or by independent facilities outside main facility 32. Regardless of its source, advertising information and program guide information may be maintained on a server 42 within television distribution facility 38 if desired.

Server 42 may be capable of handling text, graphics, video and audio. If desired, the advertising information and program guide information may be passed through rather than stored at television distribution facility 38. Advertising information and program guide information may also be distributed to user television equipment 44 using a dial-up connection, Internet link, paging link or other suitable communications path that does not directly involve television distribution facility 38.

Each viewer has a receiver, which is typically a set-top box 48, but which may be other suitable television equipment. For example, the invention may be used with an advanced television receiver into which circuitry similar to that of a set-top-box has been integrated, or may be used with a personal computer television (PC/TV). For purposes of illustration and clarity, the present invention is described primarily in the context of program guides implemented on set-top boxes. Program guide data is typically distributed to set-top boxes 48 periodically (e.g. once per day), continuously or on demand. Television distribution facility 38 may also poll set-top boxes 48 periodically for certain information (e.g., pay program account information or information regarding programs that have been purchased and viewed using locally-generated authorization techniques).

Set-top box 48 may contain a microprocessor and other circuitry for executing instructions to support an interactive television program guide. While the invention will be described in conjunction with a system in which data is distributed from a main facility to a program guide on user television equipment 44 via a television distribution facility, other suitable systems may also be used. If desired, the program guide may be implemented using a client-server architecture in which the primary processing power for the program guide is provided by a server located at, for example, television distribution facility 38 or main facility 32. User television equipment 44 (e.g., a PC/TV, etc.) may act as a client processor.

While the interactive television program guide implemented on set-top box 48 is used, television program information may be displayed on television 52 or any other suitable monitor. The program guide may provide program information in a list format. The list may be automatically scrolled to allow the viewer to review the program listings in the list. If desired, the viewer may select program listings from the list to obtain additional information about the selected item, or to order movies, concerts or other forms of entertainment on a pay-per-view basis. If desired, the program guide may allow viewers to scroll or page the list up or down by pressing keys on the remote control or set-top box or using any other suitable viewer input user interface to generate an appropriate signal.

The names of each available program with pertinent information such as time and channel at which it will be shown may be provided. If desired, video for the channel to which the set-top box is tuned may be displayed while program information about the displayed program or other programs is provided in a border of the screen or another designated region, such as a flip or browse display. Flip and browse displays are described, for example, in Knee et al. U.S. Pat. No. 5,589,892 which is hereby incorporated by reference herein in its entirety. The viewer may obtain information about the current program on the tuned channel (in the case of a flip display) or other channels or times (a browse display) while viewing the tuned channel. Pseudo-ads may be implemented in these and other types of program guides.

Each set-top box 48, television 52 and optional videocassette recorder or other recording device 50 may be controlled by one or more remote controls 54 or any other suitable viewer input interface such as a wireless keyboard, mouse, trackball, dedicated set of keys, voice recognition system, display remote, personal digital assistant (PDA) etc. If a display remote is used as a viewer input interface, pseudo-ads and regular advertisements may be displayed on the display remote, and may be selected using a touch screen interface on the remote. Displaying advertising information on a display remote is described in U.S. Provisional Patent Application Serial No. 60/138,868 filed Jun. 11, 1999 which is hereby incorporated by reference herein in its entirety. Multiple television and audio channels (analog, digital, or both analog and digital) may be provided to set-top boxes 48 via communications paths 46. If desired, program listings and advertising information may be distributed by one or more distribution facilities that are similar to but separate from television distribution facility 38 using communications paths that are separate from communications paths 46.

Viewers will preferably be able to interactively obtain additional information or order products or services that are displayed in regular advertisements and pseudo-ads. Such inquiries may be satisfied by fulfillment facilities 49 and 51. If desired, orders may be transmitted directly to fulfillment facilities via links 53, which may be telephone links, networks such as local area networks (LANs), wide area networks (WANs), the Internet or other suitable communications links. Orders may also be transmitted to television distribution facility 38 via links 46, where the billing system of the television distribution facility may be used. After the television distribution facility 38 has processed the viewer's order, television distribution facility 38 may transmit the order to fulfillment facility 49 via link 55.

A number of suitable techniques may be used to distribute advertising information. For example, if each path 46 includes a number of traditional analog television channels, one or more of these channels may be used to support a number of digital channels. The bandwidth of each analog channel may often support ten or more of such digital channels. If desired, advertising information may be provided from server 42 in a continuously looped arrangement on these digital channels or other suitable digital paths. In this case, information provided to set-top box 48 may be used to determine which digital channels to tune to when it is time to display a desired advertisement. If desired, set-top box 48 and server 42 may negotiate to determine a channel or other digital stream on which to provide the desired output in order to provide regular advertisements and/or pseudo-ads on demand. Still another advertising distribution scheme includes distributing advertising information using an out of band channel or other digital path. The set-top box may use two tuners so that advertising information may be received with one tuner while the other tuner is used by the viewer to watch television. Advertising information that originates from main facility 32 or a separate facility may be distributed to viewer television equipment 44 using these or other suitable techniques.

Figure 2:
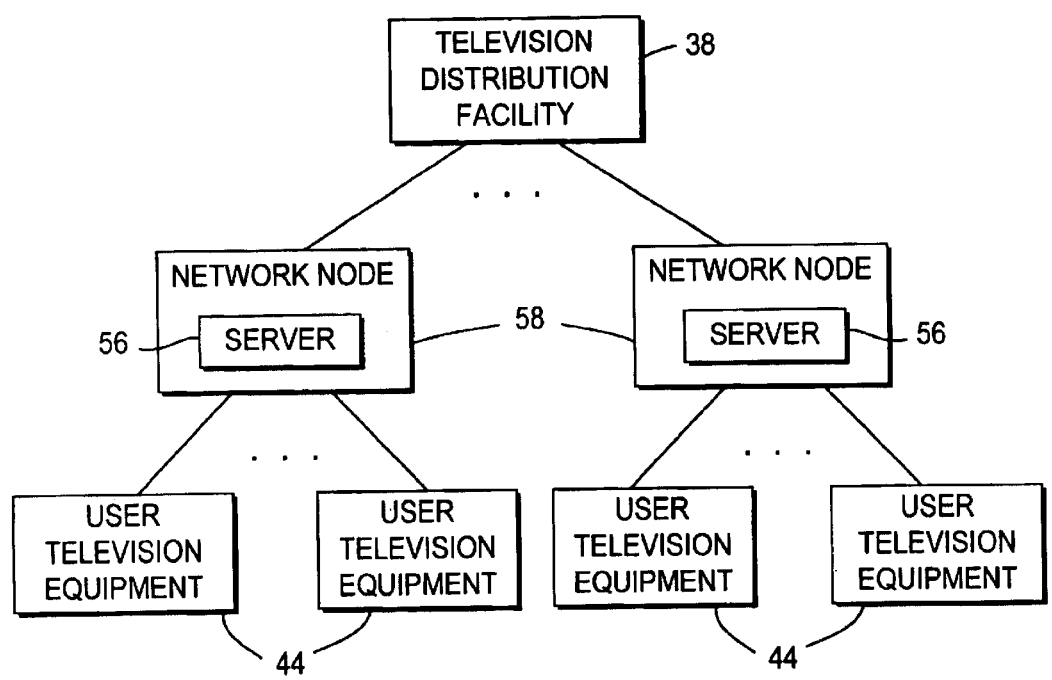
FIG. 2 is a diagram that depicts how servers may be located at network nodes in accordance with the present invention.

As shown in FIG. 2, the capabilities of server 42 may be provided using servers 56 located at network nodes 58. Servers such as servers 56 may be used instead of server 42 or may be used in conjunction with a server 42 or located at the television distribution facility.

Regular advertisements and pseudo-ads may contain text, graphics (including animation), video and audio. Graphics for advertising information may be downloaded periodically to set-top boxes 48 and stored locally. These graphics may be accessed locally when needed by the program guide implemented on set-top box 48. Graphics may also be provided in a continuously-looped arrangement on one or more digital channels or streams on paths 46. With such a continuously-looped arrangement, a map indicating the location of the latest graphical information is also preferably downloaded periodically to set-top boxes 48. The program guides on set-top boxes 48 may use the map to locate desired graphics information on the digital channels.

Advertisements may be provided to set-top boxes 48 using the same paths that are used for distributing program guide data. For example, advertising data from database 36 may be provided to set-top boxes 48 using link 40, television distribution facility 38, and paths 46. The advertisements may be stored locally in set-top boxes 48 and updated periodically (e.g., once per day). Advertisements may also be provided as described above, i.e. periodically or continuously. Advertisements may also be provided on demand by directing the program guide to retrieve them from a server.

Figure 3:
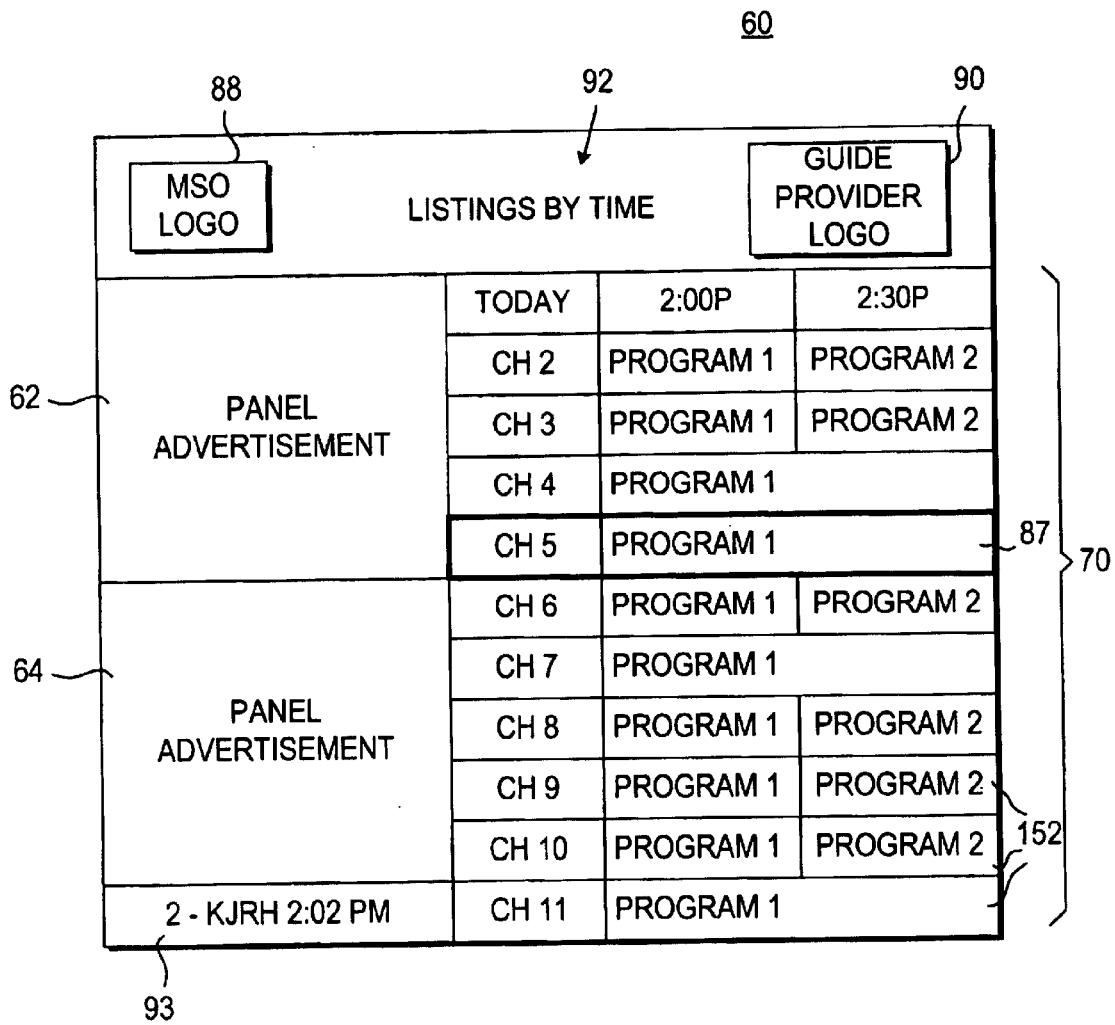
FIG. 3 illustrates a program guide display screen that includes panel advertisements, logos and program listings in accordance with the present invention.

As shown in FIG. 3, a program guide with pseudo-ads may display a program guide screen such as by time listings screen 60. One way that advertising information may be provided to a viewer of such a program guide display is in the form of panel advertisements 62 and 64. Logos 88 and 90 may also be provided. The current time and the channel to which the set-top box is tuned may be displayed in a current time and channel region 93. Either panel advertisement 62 or 64 may be used to display any type of advertising information. A regular advertisement may be displayed in panel 62 while a pseudo-ad is displayed in panel 64 or vice-versa. If desired, either regular advertisements or pseudo-ads could be displayed in both panels 62 or 64. Arrangements for displaying advertising information in a television program guide are described in U.S. patent application Ser. No. 09/070,604, filed Apr. 30, 1998 which is hereby incorporated by reference herein in its entirety.

Regular advertisements and pseudo-ads may be stored in the same, separate or overlapping databases. Such advertising information may be stored at a main facility or locally. It is also possible to store some pseudo-ads with regular advertisements while other pseudo-ads are stored separately or generated as needed. These storage schemes and other suitable storage schemes may be used. It will, however, preferably appear to the viewer that regular advertisements and pseudo-ads are intermingled while they are being displayed.

Viewers may select regular advertisements and pseudo-ads to access options that are related to a product or other item being displayed or advertised. Viewers may also change which ads and pseudo-ads are being displayed. This will typically include moving to the next regular advertisement or pseudo-ad, or viewing a regular advertisement or pseudo-ad that has already been displayed by highlighting the regular advertisement or pseudo-ad currently being displayed, and pressing a key on a remote control or set-top box, such as an up or down directional arrow. For example, in the arrangement shown in FIG. 3, pressing an up arrow key while highlighting the top panel advertisement may cause the previous two advertisements to be displayed, while pressing a down arrow while the bottom panel advertisement is highlighted may cause the next two advertisements to be displayed.

The content of advertisements 62 and 64, and logos 88 and 90 may be cycled or changed over a suitable time period (e.g., every few seconds). These items may also be cycled or changed at the viewer's demand or cycled or changed based on a criteria other than time if desired. Transitions between advertisements that are cycled or changed may be abrupt or may involve a gradual fade, dissolve, wipe, morph, or other suitable special effect.

Like regular advertisements, pseudo-ads may include text, graphics, audio and video information. A viewer may select a pseudo-ad of interest by highlighting it using a remote control directional arrow key or other suitable navigation keys and by pressing an OK (or select or enter, etc.) key on a remote control or set-top box 48. The display of pseudo-ads and regular advertisements may be mixed for greatest effect. Rather than display a large group of regular advertisements first, followed by a continuous display of pseudo-ads, both forms of advertising may be intermingled so that when the system or viewer sequences through the ads, the viewer is presented with a distributed mixture of ads and pseudo-ads. For example, the viewer may view a screen that includes program listings and regular advertisements when the program guide is initially displayed. As the guide remains on the screen, and the viewer continues to review the list of available programs, the initially displayed regular advertisements may be automatically replaced by new regular advertisements and pseudo-ads. Those replacement regular advertisements might be replaced by pseudo-ads, while the pseudo-ads are replaced by new pseudo-ads. Or, one regular advertisement might be replaced by a pseudo-ad while another regular advertisement is replaced by a regular advertisement.

Quite often, the viewer may be attracted to the content of a pseudo-ad. The viewer may select a pseudo-ad of interest to obtain more information about that pseudo-ad or to launch an associated application. Viewers may often watch the program guide in order to wait for one or more desirable pseudo-ads to appear. This will require the viewer to watch regular advertisements until the desired pseudo-ad for which she has been waiting is displayed. In this manner, the mixing of pseudo-ads with regular advertisements serves to cause viewers to watch additional regular advertisements, which allows advertisers to reach a larger number of potential customers.

Illustrative pseudo-ads 104 are shown in FIGS. 4A–4F. Pseudo ads 104A–104F include non-advertising types of materials that may be provided for the viewer's entertainment and information. While pseudo-ads 104A–104F are generally not provided for advertising purposes, it is possible for them to encourage viewers to purchase products or to contain a small amount of what otherwise might be regarded as "advertising." For example, the pseudo-ad 104A depicted in FIG. 4A allows the viewer to play a trivia game. Such a game could easily be provided by or endorsed by the manufacturer of a well known commercially-available trivia game. A tagline or other promotional region could be added to encourage the viewer to purchase this commercially-available game. The viewer may select this pseudo-ad 104A to tune to a trivia game show or to tune to a channel that is dedicated to broadcasting game shows.

Figure 4B:
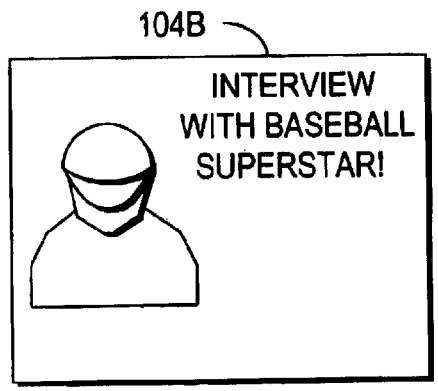
FIGS. 4A–4F show examples of pseudo-ads that may be provided in a program guide in accordance with the present invention.
Figure 4C:
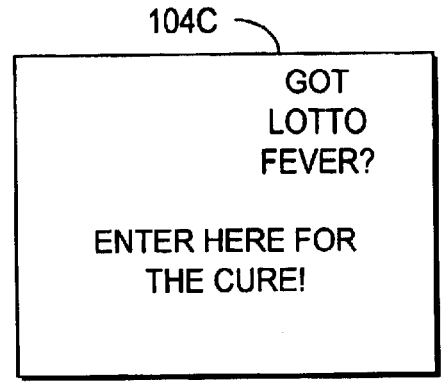
Figure 4A:
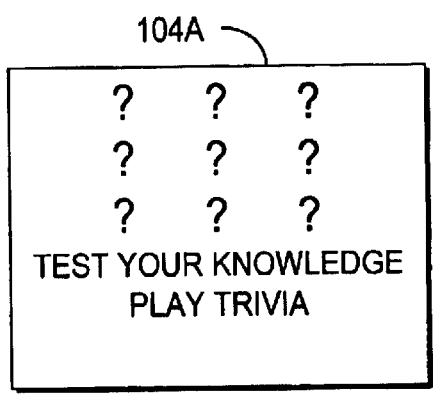

The program guide may take various actions when a pseudo-ad is selected by the viewer. For example, FIG. 4B depicts a pseudo-ad 104B for an interview with a famous athlete. Viewers can select this pseudo-ad to view the interview and perhaps obtain statistics for his performance, or statistics for his entire team or league. Links to other athletes and sports may also be provided. FIG. 4C depicts a pseudo-ad for a lottery contest. Viewers can highlight it to access interactive contests such as government sponsored lottery contests, off track betting, and similar interactive contests.

Figure 4D:
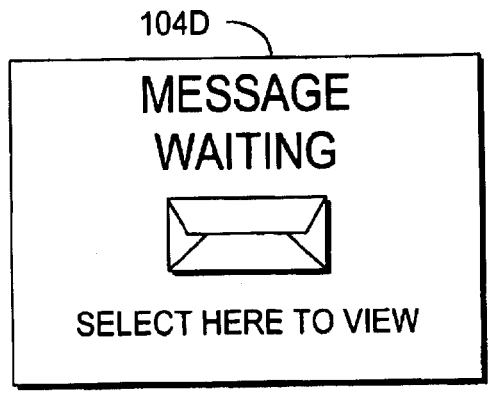
Figure 4E:
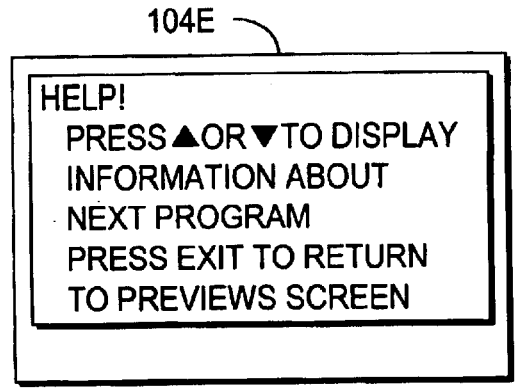

FIG. 4D depicts a pseudo-ad 104D that informs the viewer that a message has been received. This pseudo-ad will preferably include regions in which the sender and subject of the message are identified. The, viewer may select a pseudo-ad 104D to read the full text of the message. A pseudo-ad for a help message 104E is illustrated in FIG. 4E. This type of pseudo-ad may be selected to find out what options are available for the program information currently displayed on the program guide display screen. The viewer may press a key on a remote control or set-top box labeled "HELP" (for example) to direct the program guide to display this type of pseudo-ad in a program guide display screen. The viewer may then select the pseudo-ad to initiate a help function, to obtain a detailed description of available help, or to navigate through various help menus.

Figure 4F:
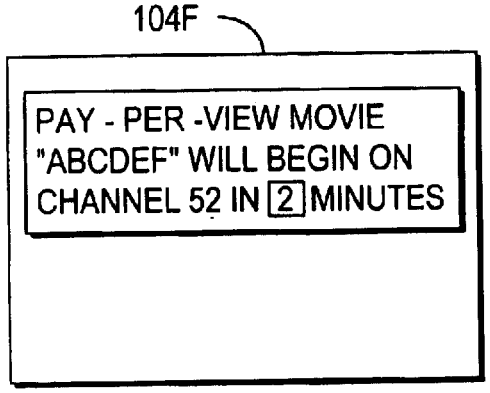

Pseudo-ad 104F shown in FIG. 4F may be used to inform the viewer that a program that has been ordered is about to begin. The viewer may select this pseudo-ad to direct the program guide to tune to the ordered program or to display information or options that are related to the ordered program, such as setting a program reminder or scheduling the program for recording.

Numerous other types of pseudo-ads may be provided. Examples include local, regional or national news and weather reports, stock price updates, and live auctions. Selecting pseudo-ads such as these may direct the program guide to tune the set-top box to a related channel (i.e. an all news channel or a weather reporting channel), or may enable the viewer to change viewing options. For example, the viewer may designate which stock prices are to be displayed or set an alarm to alert the viewer when a certain type of product is being auctioned.

Pseudo-ads may be used to promote specific program guide features. For example, a pseudo-ad may inform a viewer that program titles may be searched alphabetically. The viewer may select this pseudo-ad to perform that function. Pseudo-ads may also be used to access customer service screens. For example, the viewer may select a pseudo-ad to perform a desired function such as viewing billing information, or to obtain additional information such as a telephone number or address that may be used to contact a customer service representative. Pseudo-ads may also be used to access an e-mail system or web link that sends messages to customer service representatives or other representatives.

The viewer may gain access to the pseudo-ads 104 when the program guide is displayed. Some viewers who use program guides with pseudo-ads may access the program guide primarily for the purpose of accessing the pseudo-ads. The program guide with pseudo-ads enables the viewer to access any functions that are associated with pseudo-ads and to initiate them as desired by simply highlighting and selecting a pseudo-ad while it is displayed on the screen. A viewer may also select a regular advertisement 102 to obtain detailed information about a displayed product, program or service.

Figure 5:
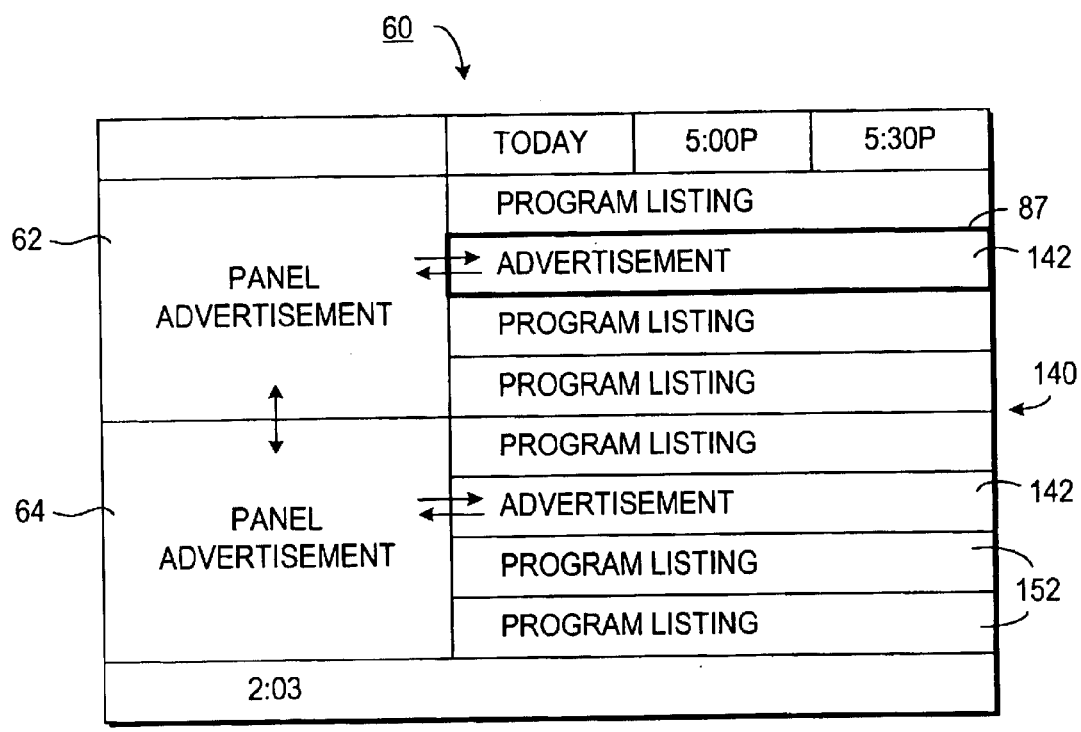
FIG. 5 depicts an illustrative interactive television program guide display screen that shows various types of advertisements that may be displayed by a program guide in accordance with the present invention.

FIGS. 5–8 show examples of how pseudo-ads 104 may be displayed among television program listings. As shown in FIG. 5, advertising information may be embedded in program listings such as in regions 142. These regions 142 may be used to display pseudo-ads as well as regular advertisements. In one embodiment, advertising information may be provided within the program listings, and may scroll or page along with them. In another embodiment, program listings may scroll past embedded regions 142 that remain stationary.

In either case, a regular advertisement or pseudo-ad may be provided in an embedded region 142, and the viewer may highlight and select it to obtain information or to launch an application or initiate other activity. The viewer may highlight an embedded region 142 and press, for example, a right arrow key to move to the next regular advertisement, or press the left arrow to move to the previous pseudo-ad. If the viewer presses a right arrow key while a program listing is highlighted the guide may change to a later time period, with or without changing an advertisement in an embedded region 142 that is also displayed on the program guide display screen. If the viewer presses a right arrow key while an embedded advertising region 142 is highlighted, the guide may change to the next advertisement or pseudo-ad that has been set up for display in that region. Alternatively, there may be a key on the remote control or set top box that the viewer may press to change the regular advertisements and pseudo-ads that are displayed on the program guide display screen.

Figure 6:
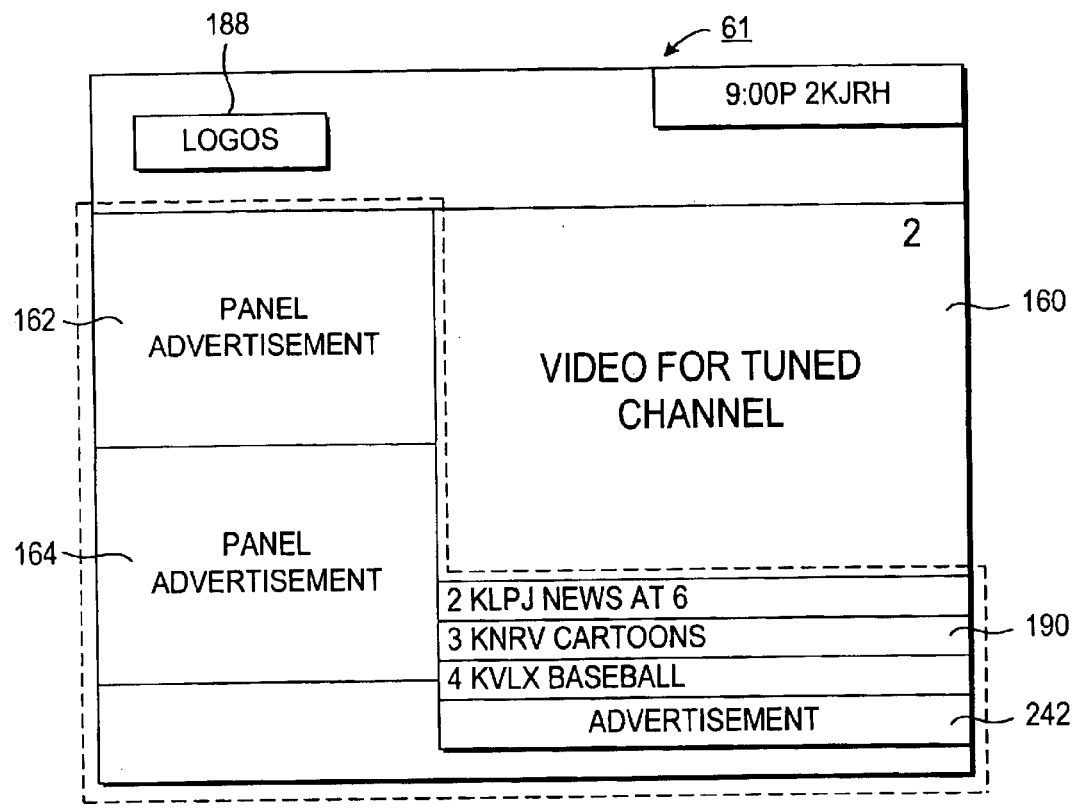
FIG. 6 shows an illustrative program guide display screen that contains program listing information, video content and advertisements in accordance with the present invention.

As shown in FIG. 6, a program guide with pseudo-ads may simultaneously display program listings, video content and advertisements. The viewer's television may be tuned to a broadcast channel (shown here as channel 2) and a program may be displayed in a scaled video region 160 in the program guide display screen. Program listings may scroll, transition or otherwise be displayed in region 190. Panel advertisements 162 and 164 may be displayed on the side of the viewing area, while embedded region 242 is provided at the top, or at the bottom as shown. Logo 188 can also be included. The placement of panel advertisements 162 and 164, embedded advertisement 242 and logo 188 as shown here are for illustrative purposes only. Advertisements and logos may be located in any convenient location that will allow video in video region 160 to be clearly displayed. Moreover, the use of panel advertisements 162 and 164 does not require the simultaneous display of embedded regions 242 or logos 188.

If desired, the viewer may highlight a top panel advertisement 162 and press, for example, an up arrow to move to the next regular advertisement or pseudo-ad. Similarly, the viewer may highlight the bottom panel advertisement 164 and press the down arrow to move to the next regular advertisement or pseudo-ad. Again, the viewer may press a right arrow key while an embedded advertisement 242 is highlighted to move to the next regular advertisement or pseudo-ad while that region is highlighted. Alternatively, there may be a key or set of keys on the remote control or set-top box that is dedicated to changing advertising information in any or all of these locations.

In addition, although the invention has been described as using video data from a television broadcast, other types of video data could easily be provided in video region 60 instead. For example, the channel to which the viewer is tuned could be one that displays previews for upcoming attractions, messages or other images from the program provider. The invention could also be used in a system that allows the viewer to select a video and play it on demand. Text and graphical non-video data may be provided instead of or in addition to video data.

Figure 7:
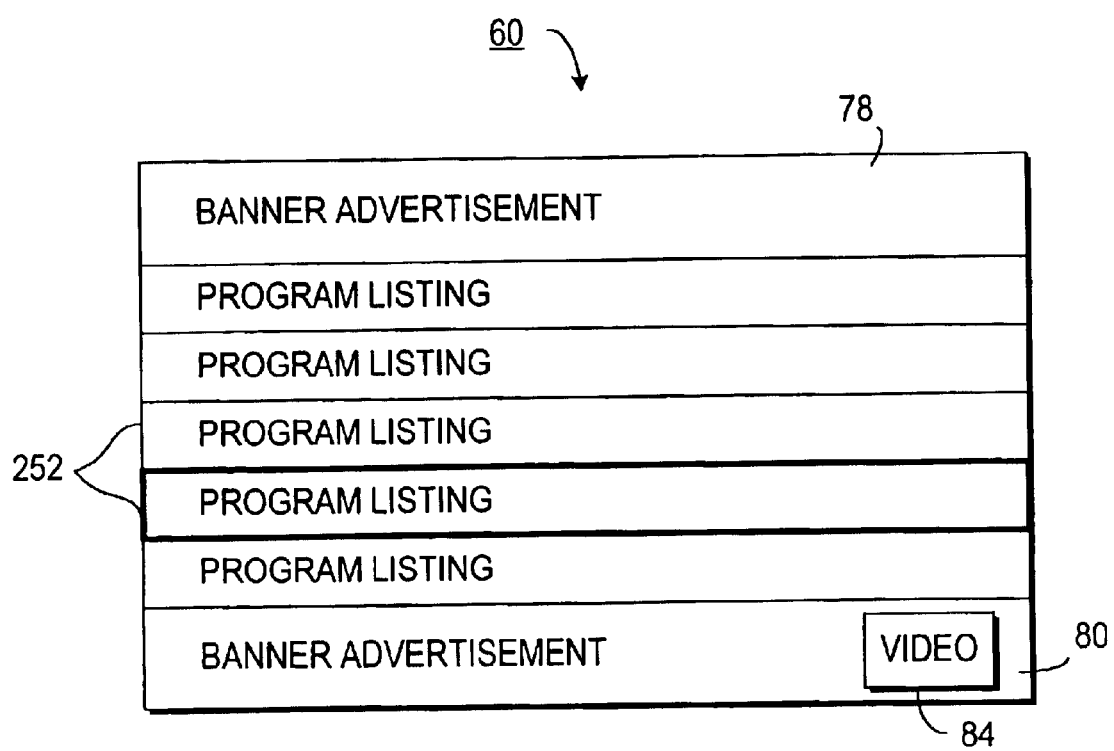
FIG. 7 illustrates a program guide screen with banner advertisements bordering program listings in accordance with the present invention.

As shown in FIG. 7, program guides may also display regular advertisements and pseudo-ads as banner advertisements 78 and 80. While banner advertisements 78 and 80 are shown here at the top and bottom borders of program listings 70, they could be provided at the sides, or in the center or at the corners of the program guide display screen. Banner advertisements 78 or 80 may include video 84 which may be a video clip, preview or broadcast data. The viewer may highlight and select a banner advertisement 78 or 80 and may press a button (e.g. a directional arrow) to move to previous or subsequent regular advertisements or pseudo-ads.

Figure 8:
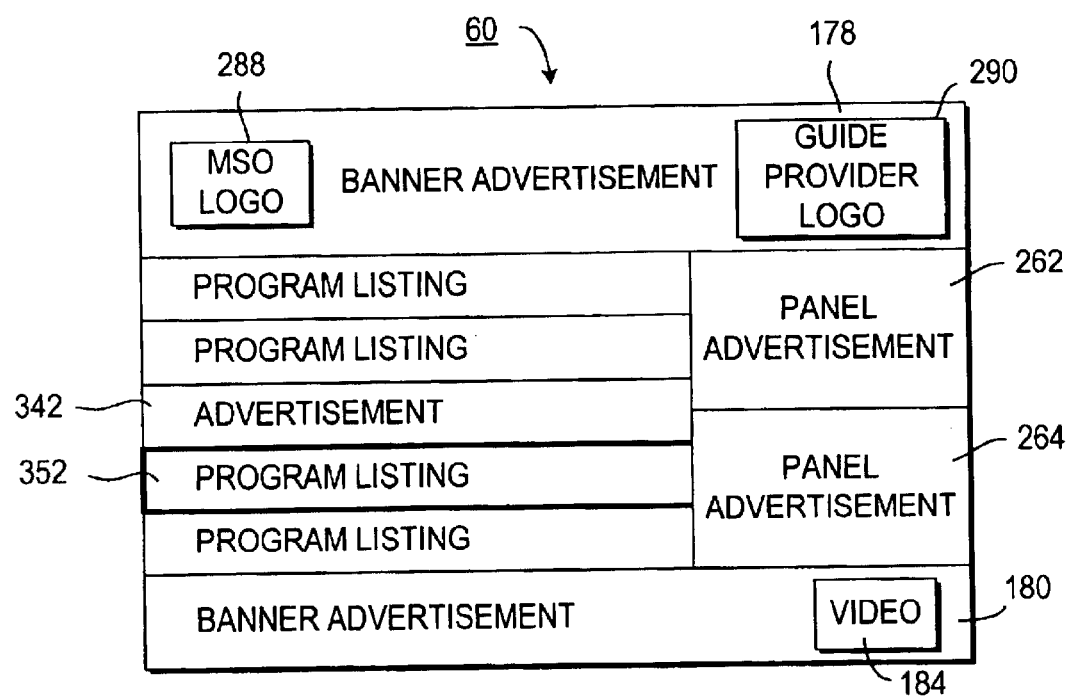
FIG. 8 shows an illustrative program guide display screen that contains various types of advertisements in accordance with the present invention.

As shown in FIG. 8, the program guide display screen may provide a display screen that includes panel advertisements 262 and 264, embedded advertisements 342 and banner advertisements 78 and 80 along with program listings 352 on a single screen such as by time listings screen 60. Both regular advertisements 102 and pseudo-ads 104 may be displayed at any of these locations, and the display of these regular advertisements and pseudo-ads may be controlled by highlighting them and pressing direction arrow keys, such as left, right, up or down.

A display of the type shown in FIG. 8 may include, for example, regular advertisements displayed as panel advertisement 262 and embedded advertisement 342, a pseudo-ad such as a lottery pseudo-ad displayed as panel advertisement 264 and a sports update pseudo-ad displayed as banner advertisement 178. The viewer may select panel advertisement 262 and embedded advertisement 142 to obtain more information about the displayed products, may select banner advertisement 178 to obtain a detailed sports report including statistics for a favorite team or player as well as player interviews, or may select panel advertisement 262 to enter a lottery.

All of this information may be available as the viewer views program listings 352 to allow desirable television programs to be selected before or after the viewer explores advertising information. If desired, pseudo-ads may be mixed in with the displayed regular advertisements in FIG. 8 rather than displayed together as a group or isolated to only one type of advertisement display (i.e. one panel, banner or embedded advertisement).

Figure 9:
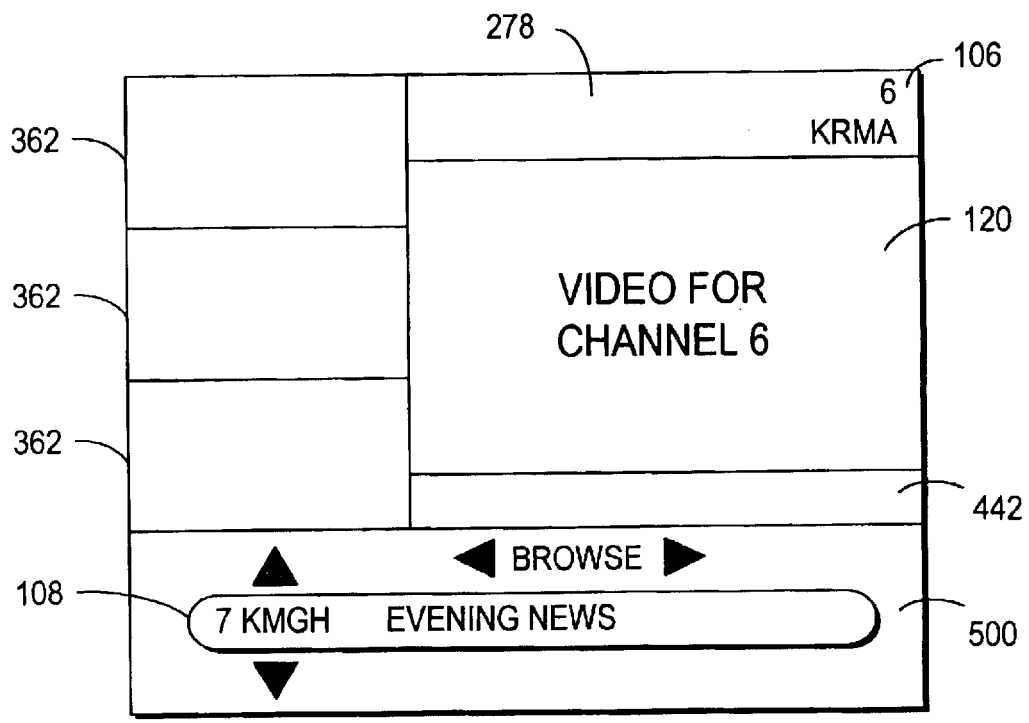
FIG. 9 shows an illustrative browse display in accordance with the present invention.
Figure 10:
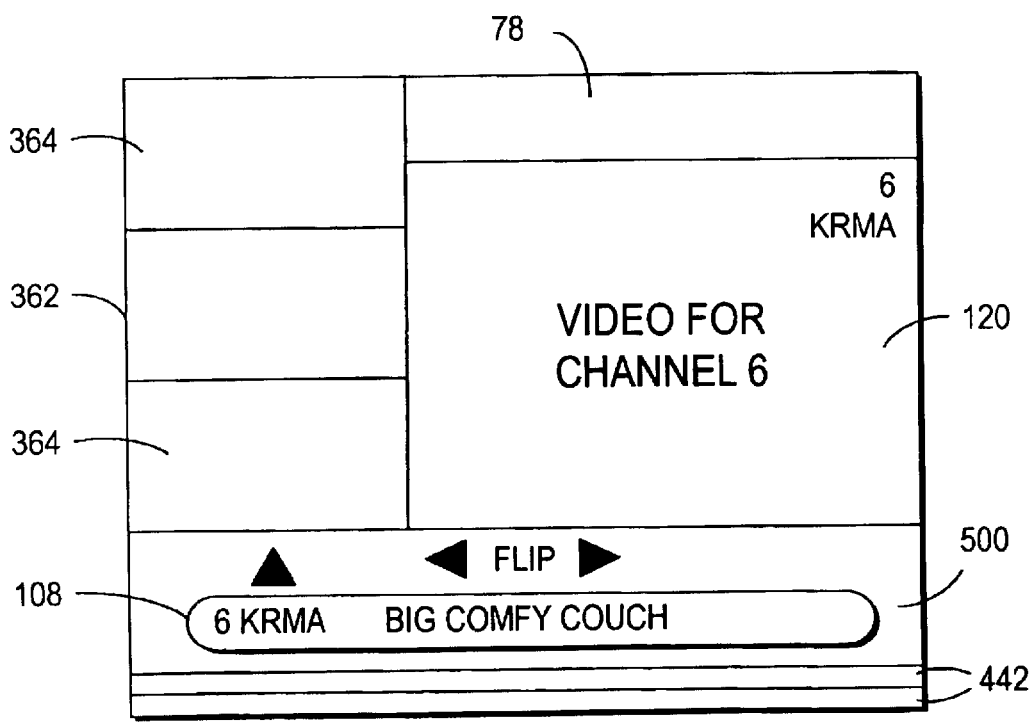
FIG. 10 shows an illustrative flip display in accordance with the present invention.

As shown in FIGS. 9 and 10, the present invention may also be implemented in a program guide that provides a browse or flip display. A browse display, shown in FIG. 9, allows the viewer to remain tuned to the channel being displayed on program guide display screen 120, while providing information about programs on other channels or at other times. A flip display, shown in FIG. 10, allows the viewer to provide additional information about the program to which the television is tuned.

Panel advertisements 362 and 364, banner advertisement 278 and embedded advertisement 442 may be displayed so that they do not interfere with the display of information on program guide display screen 120 or in flip/browse region 500. Embedded advertisements 442 may be provided inside flip/browse region 500.

While the invention has been described using embedded regions, panel advertisements and banner advertisements, any other suitable type of region may be used to display advertising information if desired.

A program guide with advertisements and pseudo-ads has therefore been provided. The foregoing is merely illustrative of the principles of this invention and various modifications can be made by those skilled in the art without departing from the scope and spirit of the invention.

What is claimed is:

1. A method of displaying pseudo-ads and regular advertisements in an interactive program guide, comprising:
   displaying program information in a program portion of a program guide display screen;
   displaying in an advertising portion of the program guide display screen, the regular advertisements and the pseudo-ads, wherein the pseudo-ads are non-advertising materials that are used to encourage viewers to use the program guide for a longer period of time, thereby causing the viewers to view more regular advertisements;
   cycling content displayed in the advertising portion so that the pseudo-ads are intermingled with the regular advertisements;
   receiving commands from a user to navigate a highlight region to the advertising portion of the program guide display screen; and
   receiving commands from the user when the highlight region is at the advertising portion that cause the regular advertisement or the pseudo-ad being displayed in the advertising portion to which the highlight region has been navigated to change to a different regular advertisement or pseudo-ad.

2. The method defined in claim 1 wherein the program information includes video.

3. The method defined in claim 1 wherein the program information includes a list of television programs.

4. The method defined in claim 3 further comprising automatically scrolling the program information.

5. The method defined in claim 3 further comprising allowing a viewer to move program information about the program guide display screen.

6. The method defined in claim 1 wherein the advertising portion includes a panel advertising region.

7. The method defined in claim 1 wherein the advertising portion includes a banner advertising region.

8. The method defined in claim 1 wherein the advertising portion is embedded in the program portion.

9. The method defined in claim 8 further comprising automatically scrolling the embedded advertisements and the program portion across the program guide display screen together.

10. The method defined in claim 8 further comprising:
    maintaining an embedded advertising region in a stationary position on the program guide display screen; and
    scrolling a list of programs across while the embedded advertising region remains stationary.

11. The method defined in claim 1 further comprising providing additional information about a product displayed in advertisements in response to a viewer input.

12. The method defined in claim 11 wherein the viewer input selects the regular advertisement.

13. The method defined in claim 1 further comprising delivering a message to a viewer.

14. The method defined in claim 13 further comprising displaying a pseudo-ad on the program guide display screen when a message has been delivered to the viewer.

15. The method defined in claim 14 further comprising enabling the viewer to view the full text of the delivered message by selecting the pseudo-ad.

16. The method defined in claim 1 further comprising enabling a viewer to access a customer service feature by selecting a pseudo-ad.

17. The method defined in claim 16 wherein the customer service feature includes viewer account information.

18. The method defined in claim 16 wherein the customer service feature includes customer service contact information.

19. The method defined in claim 1 further comprising initiating an action related to the pseudo-ad in response to a viewer input.

20. The method defined in claim 19 wherein the viewer input selects the pseudo-ad.

21. The method defined in claim 19 wherein the action related to the pseudo-ad involves obtaining additional information related to a content of the pseudo-ad.

22. The method defined in claim 19 wherein the action related to the pseudo-ad involves enabling a viewer to play a game.

23. The method defined in claim 22 wherein the game is a trivia game.

24. The method defined in claim 19 wherein the action related to the pseudo-ad involves enabling a viewer to enter a contest.

25. The method defined in claim 24 wherein the contest is a lottery.

26. The method defined in claim 24 wherein the contest is an auction.

27. The method defined in claim 19 wherein the action related to the pseudo-ad involves enabling a viewer to view a video clip.

28. The method defined in claim 19 wherein the action related to the pseudo-ad involves enabling a viewer to order a product.

29. The method defined in claim 19 wherein the action related to the pseudo-ad involves starting a function that is associated with a television program being promoted in the pseudo-ad.

30. The method defined in claim 29 wherein starting the function comprises tuning to the television program being promoted in the pseudo-ad.

31. The method defined in claim 29 wherein starting the function further comprises describing the content of a television program being promoted in the pseudo-ad.

32. The method defined in claim 29 wherein starting the function further comprises enabling a viewer to set a reminder which prompts the viewer to tune to the television program when the television program is about to begin.

33. The method defined in claim 19 wherein the action related to the pseudo-ad further comprises enabling a viewer to send a message to a customer service representative.

34. The method defined in claim 19 wherein the pseudo-ad includes a sports information report.

35. The method defined in claim 34 wherein the action related to the pseudo-ad further comprises enabling a viewer to access a channel dedicated to broadcasting sports.

36. The method defined in claim 19 wherein the pseudo-ad includes a weather information report.

37. The method defined in claim 36 wherein the action related to the pseudo-ad further comprises enabling a viewer to access a channel dedicated to reporting weather information.

38. The method defined in claim 19 wherein the pseudo-ad includes a stock market information report.

39. The method defined in claim 38 wherein the action related to the pseudo-ad further comprises enabling a viewer to access a channel dedicated to reporting stock market conditions.

40. The method defined in claim 19 wherein the pseudo-ad includes a news information report.

41. The method defined in claim 40 wherein the action related to the pseudo-ad further comprises enabling a viewer to access a channel dedicated to reporting news.

42. The method defined in claim 19 wherein the action related to the pseudo-ad further comprises assisting a viewer in operating the program guide.

43. An apparatus for displaying pseudo-ads and regular advertisements in an interactive program guide, comprising:
   means for displaying program information in a program portion of a program guide display screen;
   means for displaying in an advertising portion of the program guide display screen, the regular advertisements and the pseudo-ads, wherein the pseudo-ads are non-advertising materials that are used to encourage viewers to use the program guide for a longer period of time, thereby causing the viewers to view more regular advertisements;
   means for cycling content displayed in the advertising portion so that the pseudo-ads are intermingled with the regular advertisements;
   means for receiving commands from a user to navigate a highlight region to the advertising portion of the program guide display screen; and
   means for receiving commands from the user when the highlight region is at the advertising portion that cause the regular advertisement or the pseudo-ad being displayed in the advertising portion to which the highlight region has been navigated to change to a different regular advertisement or pseudo-ad.

44. An apparatus defined in claim 43 wherein the program information display means includes means for displaying video.

45. An apparatus defined in claim 43 wherein the program information display means includes means for displaying a list of television programs.

46. An apparatus defined in claim 45 wherein the program information display means further comprises means for automatically scrolling the program information.

47. An apparatus defined in claim 45 wherein the program information display means further comprises means for allowing a viewer to move program information about the program guide display screen.

48. An apparatus defined in claim 43 wherein the advertising portion includes a panel advertising region.

49. An apparatus defined in claim 43 wherein the advertising portion includes a banner advertising region.

50. An apparatus defined in claim 43 wherein the advertising portion is embedded in the program portion.

51. An apparatus defined in claim 50 wherein the advertising information display means further comprises means for automatically scrolling the embedded advertisements and the program portion across the program guide display screen together.

52. An apparatus defined in claim 50 further comprising:
   means for maintaining an embedded advertising region in a stationary position on the program guide display screen; and
   means for scrolling a list of programs across while the embedded advertising region remains stationary.

53. An apparatus defined in claim 43 further comprising means for providing additional information about a product displayed in one of the regular advertisements in response to a viewer input.

54. An apparatus defined in claim 53 further comprising means for allowing the viewer input to select the advertisement.

55. An apparatus defined in claim 43 further comprising means for delivering a message to a viewer.

56. An apparatus defined in claim 55 further comprising means for displaying a pseudo-ad on the program guide display screen when a message has been delivered to the viewer.

57. An apparatus defined in claim 56 further comprising means for enabling the viewer to view the full text of the delivered message by selecting the pseudo-ad.

58. An apparatus defined in claim 43 further comprising means for enabling a viewer to access a customer service feature by selecting a pseudo-ad.

59. An apparatus defined in claim 58 wherein the customer service feature includes means for allowing the viewer to review viewer account information.

60. An apparatus defined in claim 58 wherein the customer service feature includes customer service contact information.

61. An apparatus defined in claim 43 further comprising means for initiating an action related to the pseudo-ad in response to a viewer input.

62. An apparatus defined in claim 61 wherein the action initiating means further comprises means for enabling the viewer to select the pseudo-ad.

63. An apparatus defined in claim 61 wherein the action initiating means includes means for obtaining additional information related to a content of the pseudo-ad.

64. An apparatus defined in claim 61 wherein the action initiating means includes means for enabling a viewer to play a game.

65. An apparatus defined in claim 64 wherein the game is a trivia game.

66. An apparatus defined in claim 61 wherein the action initiating means includes means for enabling a viewer to enter a contest.

67. An apparatus defined in claim 66 wherein the contest is a lottery.

68. An apparatus defined in claim 66 wherein the contest is an auction.

69. An apparatus defined in claim 61 wherein the action initiating means includes means for enabling a viewer to view a video clip.

70. An apparatus defined in claim 61 wherein the action initiating means includes means for enabling a viewer to order a product.

71. An apparatus defined in claim 61 wherein the action initiating means includes means for starting a function that is associated with a television program being promoted in the pseudo-ad.

72. An apparatus defined in claim 71 wherein the function starting means includes means for tuning to the television program being promoted in the pseudo-ad.

73. An apparatus defined in claim 71 wherein the function starting means includes means for describing the content of a television program being promoted in the pseudo-ad.

74. An apparatus defined in claim 71 wherein the function starting means includes means for enabling a viewer to set a reminder which prompts the viewer to tune to the television program when the television program is about to begin.

75. An apparatus defined in claim 61 wherein the function starting means includes means for enabling a viewer to send a message to a customer service representative.

76. An apparatus defined in claim 61 wherein the pseudo-ad includes a sports information report.

77. An apparatus defined in claim 76 wherein the function starting means includes means for enabling a viewer to access a channel dedicated to broadcasting sports.

78. An apparatus defined in claim 61 wherein the pseudo-ad includes a weather information report.

79. An apparatus defined in claim 78 wherein the function starting means includes means for enabling a viewer to access a channel dedicated to reporting weather information.

80. An apparatus defined in claim 61 wherein the pseudo-ad includes a stock market information report.

81. An apparatus defined in claim 80 wherein the function starting means includes means for enabling a viewer to access a channel dedicated to reporting stock market conditions.

82. An apparatus defined in claim 61 wherein the pseudo-ad includes a news information report.

83. An apparatus defined in claim 82 wherein the function starting means includes means for enabling a viewer to access a channel dedicated to reporting news.

84. An apparatus defined in claim 61 wherein the function starting means includes means for assisting a viewer in operating the program guide.

85. An apparatus for displaying pseudo-ads and regular advertisements in an interactive program guide, comprising user television equipment configured to:

display program information in a program portion of a program guide display screen;

display in an advertising portion of the program guide display screen, the regular advertisements and the pseudo-ads, wherein the pseudo-ads are non-advertising materials that are used to encourage viewers to use the program guide for a longer period of time, thereby causing the viewers to view more regular advertisements;

cycle content displayed in the advertising portion so that the pseudo-ads are intermingled with the regular advertisements;

receive commands from a user to navigate a highlight region to the advertising portion of the program guide display screen; and receive commands from the user when the highlight region is at the advertising portion that cause the regular advertisement or the pseudo-ad being displayed in the advertising portion to which the highlight region has been navigated to change to a different regular advertisement or pseudo-ad.

86. The apparatus defined in claim 85 wherein the program information includes video.

87. The apparatus defined in claim 85 wherein the program information includes a list of television programs.

88. The apparatus defined in claim 87 wherein the user television equipment is further configured to automatically scroll the program information.

89. The apparatus defined in claim 87 wherein the user television equipment is further configured to allow a viewer to move program information about the program guide display screen.

90. The apparatus defined in claim 85 wherein the advertising portion includes a panel advertising region.

91. The apparatus defined in claim 85 wherein the advertising portion includes a banner advertising region.

92. The apparatus defined in claim 85 wherein the advertising portion is embedded in the program portion.

93. The apparatus defined in claim 92 wherein the user television equipment is further configured to automatically scroll the embedded advertisements and the program portion across the program guide display screen together.

94. The apparatus defined in claim 92 wherein the user television equipment is further configured to:

maintain an embedded advertising region in a stationary position on the program guide display screen; and scroll a list of programs across while the embedded advertising region remains stationary.

95. The apparatus defined in claim 85 wherein the user television equipment is further configured to provide additional information about a product displayed in one of the regular advertisements in response to a viewer input.

96. The apparatus defined in claim 95 wherein the viewer input selects the advertisement.

97. The apparatus defined in claim 85 wherein the user television equipment is further configured to deliver a message to a viewer.

98. The apparatus defined in claim 97 wherein the user television equipment is further configured to display a pseudo-ad on the program guide display screen when a message has been delivered to the viewer.

99. The apparatus defined in claim 97 wherein the user television equipment is further configured to enable the viewer to view the full text of the delivered message by selecting the pseudo-ad.

100. The apparatus defined in claim 85 wherein the user television equipment is further configured to enable a viewer to access a customer service feature by selecting a pseudo-ad.

101. The apparatus defined in claim 100 wherein the customer service feature includes viewer account information.

102. The apparatus defined in claim 100 wherein the customer service feature includes customer service contact information.

103. The apparatus defined in claim 85 wherein the user television equipment is further configured to initiate an action related to the pseudo-ad in response to a viewer input.

104. The apparatus defined in claim 103 wherein the viewer input selects the pseudo-ad.

105. The apparatus defined in claim 103 wherein the action related to the pseudo-ad involves obtaining additional information related to a content of the pseudo-ad.

106. The apparatus defined in claim 103 wherein the action related to the pseudo-ad involves enabling a viewer to play a game.

107. The apparatus defined in claim 106 wherein the game is a trivia game.

108. The apparatus defined in claim 103 wherein the action related to the pseudo-ad involves enabling a viewer to enter a contest.

109. The apparatus defined in claim 108 wherein the contest is a lottery.

110. The apparatus defined in claim 108 wherein the contest is an auction.

111. The apparatus defined in claim 103 wherein the action related to the pseudo-ad involves enabling a viewer to view a video clip.

112. The apparatus defined in claim 113 wherein the action related to the pseudo-ad involves enabling a viewer to order a product.

113. The apparatus defined in claim 103 wherein the action related to the pseudo-ad involves starting a function that is associated with a television program being promoted in the pseudo-ad.

114. The apparatus defined in claim 113 wherein starting the function comprises tuning to the television program being promoted in the pseudo-ad.

115. The apparatus defined in claim 113 wherein starting the function further comprises describing the content of a television program being promoted in the pseudo-ad.

116. The apparatus defined in claim 113 wherein starting the function further comprises enabling a viewer to set a reminder which prompts the viewer to tune to the television program when the television program is about to begin.

117. The apparatus defined in claim 103 wherein the action related to the pseudo-ad further comprises enabling a viewer to send a message to a customer service representative.

118. The apparatus defined in claim 103 wherein the pseudo-ad includes a sports information report.

119. The apparatus defined in claim 118 wherein the action related to the pseudo-ad further comprises enabling a viewer to access a channel dedicated to broadcasting sports.

120. The apparatus defined in claim 103 wherein the pseudo-ad includes a weather information report.

121. The apparatus defined in claim 118 wherein the action related to the pseudo-ad further comprises enabling a viewer to access a channel dedicated to reporting weather information.

122. The apparatus defined in claim 103 wherein the pseudo-ad includes a stock market information report.

123. The apparatus defined in claim 122 wherein the action related to the pseudo-ad further comprises enabling a viewer to access a channel dedicated to reporting stock market conditions.

124. The apparatus defined in claim 103 wherein the pseudo-ad includes a news information report.

125. The apparatus defined in claim 124 wherein the action related to the pseudo-ad further comprises enabling a viewer to access a channel dedicated to reporting news.

126. The apparatus defined in claim 103 wherein the action related to the pseudo-ad further comprises assisting a viewer in operating the program guide.

127. A machine readable medium encoded with machine-readable instructions for use in a system in which pseudo-ads and regular advertisements are displayed in an interactive television program guide, the machine-readable instructions comprising:
displaying program information in a program portion of a program guide display screen;
displaying in an advertising portion of the program guide display screen, the regular advertisements and the pseudo-ads, wherein the pseudo-ads are non-advertising materials that are used to encourage viewers to use the program guide for a longer period of time, thereby causing the viewers to view more regular advertisements;
cycling content displayed in the advertising portion so that the pseudo-ads are intermingled with the regular advertisements;
receiving commands from a user to navigate a highlight region to the advertising portion of the program guide display screen; and
receiving commands from the user when the highlight region is at the advertising portion that cause the regular advertisement or the pseudo-ad being displayed in the advertising portion to which the highlight region has been navigated to change to a different regular advertisement or pseudo-ad.

128. The machine readable medium defined in claim 127, wherein the program information includes video.

129. The machine readable medium defined in claim 127, wherein the program information includes a list of television programs.

130. The machine readable medium defined in claim 129, the machine-readable instructions further comprising automatically scrolling the program information.

131. The machine readable medium defined in claim 129, the machine-readable instructions further comprising allowing a viewer to move program information about the program guide display screen.

132. The machine readable medium defined in claim 127, wherein the advertising portion includes a panel advertising region.

133. The machine readable medium defined in claim 127, wherein the advertising portion includes a banner advertising region.

134. The machine readable medium defined in claim 127, wherein the advertising portion is embedded in the program portion.

135. The machine readable medium defined in claim 134, the machine readable instructions further comprising automatically scrolling the embedded advertisements and the program portion across the program guide display screen together.

136. The machine readable medium defined in claim 134, the machine-readable instructions further comprising:
maintaining an embedded advertising region in a stationary position on the program guide display screen; and
scrolling a list of programs across while the embedded advertising region remains stationary.

137. The machine readable medium defined in claim 127, the machine-readable instructions further comprising providing additional information about a product displayed in one of the regular advertisements in response to a viewer input.

138. The machine readable medium defined in claim 137, wherein the viewer input selects the advertisement.

139. The machine readable medium defined in claim 127, the machine-readable instructions further comprising delivering a message to a viewer.

140. The machine readable medium defined in claim 149, the machine-readable instructions further comprising displaying a pseudo-ad on the program guide display screen when a message has been delivered to the viewer.

141. The machine readable medium defined in claim 140, the machine-readable instructions further comprising enabling the viewer to view the full text of the delivered message by selecting the pseudo-ad.

142. The machine readable medium defined in claim 127, the machine-readable instructions further comprising enabling a viewer to access a customer service feature by selecting a pseudo-ad.

143. The machine readable medium defined in claim 142, wherein the customer service feature includes viewer account information.

144. The machine readable medium defined in claim 142, wherein the customer service feature includes customer service contact information.

145. The machine readable medium defined in claim 127, the machine-readable instructions further comprising initiating an action related to the pseudo-ad in response to a viewer input.

146. The machine readable medium defined in claim 145, wherein the viewer input selects the pseudo-ad.

147. The machine readable medium defined in claim 145, wherein the action related to the pseudo-ad involves obtaining additional information related to a content of the pseudo-ad.

148. The machine readable medium defined in claim 145, wherein the action related to the pseudo-ad involves enabling a viewer to play a game.

149. The machine readable medium defined in claim 148, wherein the game is a trivia game.

150. The machine readable medium defined in claim 145, wherein the action related to the pseudo-ad involves enabling a viewer to enter a contest.

151. The machine readable medium defined in claim 150, wherein the contest is a lottery.

152. The machine readable medium defined in claim 150, wherein the contest is an auction.

153. The machine readable medium defined in claim 145, wherein the action related to the pseudo-ad involves enabling a viewer to view a video clip.

154. The machine readable medium defined in claim 145, wherein the action related to the pseudo-ad involves enabling a viewer to order a product.

155. The machine readable medium defined in claim 145, wherein the action related to the pseudo-ad involves starting a function that is associated with a television program being promoted in the pseudo-ad.

156. The machine readable medium defined in claim 155, wherein starting the function comprises tuning to the television program being promoted in the pseudo-ad.

157. The machine readable medium defined in claim 155, wherein starting the function further comprises describing the content of a television program being promoted in the pseudo-ad.

158. The machine readable medium defined in claim 155, wherein starting the function further comprises enabling a viewer to set a reminder which prompts the viewer to tune to the television program when the television program is about to begin.

159. The machine readable medium defined in claim 145, wherein the action related to the pseudo-ad further comprises enabling a viewer to send a message to a customer service representative.

160. The machine readable medium defined in claim 145, wherein the pseudo-ad includes a sports information report.

161. The machine readable medium defined in claim 160, wherein the action related to the pseudo-ad further comprises enabling a viewer to access a channel dedicated to broadcasting sports.

162. The machine readable medium defined in claim 145, wherein the pseudo-ad includes a weather information report.

163. The machine readable medium defined in claim 162, wherein the action related to the pseudo-ad further comprises enabling a viewer to access a channel dedicated to reporting weather information.

164. The machine readable medium defined in claim 145, wherein the pseudo-ad includes a stock market information report.

165. The machine readable medium defined in claim 164, wherein the action related to the pseudo-ad further comprises enabling a viewer to access a channel dedicated to reporting stock market conditions.

166. The machine readable medium defined in claim 145, wherein the pseudo-ad includes a news information report.

167. The machine readable medium defined in claim 166, wherein the action related to the pseudo-ad further comprises enabling a viewer to access a channel dedicated to reporting news.

168. The machine readable medium defined in claim 145, wherein the action related to the pseudo-ad further comprises assisting a viewer in operating the program guide.

* * * * *

UNITED STATES PATENT AND TRADEMARK OFFICE
CERTIFICATE OF CORRECTION

PATENT NO. : 6,799,327 B1  Page 1 of 1
DATED : September 28, 2004
INVENTOR(S) : Steven J. Reynolds et al.

It is certified that error appears in the above-identified patent and that said Letters Patent is hereby corrected as shown below:

Title page,
Item [56], References Cited, OTHER PUBLICATIONS, "Ross Peddicord" reference, change "Balitomore, Mayland" to -- Baltimore, Maryland --.

Column 8,
Line 15, delete "," after "The".

Column 16,
Line 55, change "113" to -- 103 --.

Column 17,
Line 16, change "118" to -- 120 --.

Column 18,
Line 35, change "149" to -- 139 --.

Signed and Sealed this

First Day of November, 2005

JON W. DUDAS
*Director of the United States Patent and Trademark Office*